United States Patent Office 2,844,575
Patented July 22, 1958

---

2,844,575

PROCESS FOR THE PREPARATION OF CELLULOSE ACETATE IN AN ESTERIFICATION MEDIUM OF ACETIC ACID, ACETIC ANHYDRIDE, METHYLENE CHLORIDE AND SULFURIC ACID

Robert H. Wells, Union, N. J., assignor to Celanese Corporation of America, New York, N. Y., a corporation of Delaware No Drawing. Application March 23, 1956
Serial No. 573,339

2 Claims. (Cl. 260—227)

This invention relates to cellulose esters and relates more particularly to an improved process for the manufacture of lower aliphatic acid esters of cellulose.

This application is a continuation-in-part of application Serial No. 552,734, filed December 13, 1955, now abandoned.

It has previously been proposed to manufacture lower aliphatic acid esters of cellulose, such as cellulose acetate, for example, by esterifying cellulose with acetic anhydride in an acetylation medium containing methylene chloride as a solvent for the cellulose acetate being formed and perchloric acid or sulfuric acid as an esterification catalyst. While perchloric acid is a highly efficient catalyst, its use involves a number of hazards owing to the unstable nature of the acid and its salts. Sulfuric acid, on the other hand, is a relatively poor catalyst in this system so that its use requires an extended period for the completion of the esterification. As a result, when sulfuric acid is used as a catalyst, the capacity of a given esterification vessel is reduced and the expense of manufacturing the cellulose acetate is increased.

It is an important object of this invention to provide a process for the manufacture of lower aliphatic acid esters of cellulose which will be free from the foregoing and other disadvantages.

A further object of this invention is to provide a novel process for the manufacture of lower aliphatic acid esters of cellulose employing methylene chloride as a solvent and sulfuric acid as a catalyst in which the esterification will proceed at a rapid rate.

Other objects of this invention will be apparent from the following detailed description and claims.

According to the present invention, lower aliphatic acid esters of cellulose are manufactured by esterifying cellulose with an esterification medium containing a lower aliphatic acid anhydride, methylene chloride as a solvent for the ester being formed and sulfuric acid as the esterification catalyst, and also containing a small proportion of a lower aliphatic acid corresponding to the lower aliphatic acid anhydride. It has been found that the presence of the lower aliphatic acid in the esterification medium greatly increases the activity of the sulfuric acid esterification catalyst so that the esterification will go to completion in a relatively short period of time.

Cellulose from any suitable source, such as wood pulp or cotton linters, may be employed in carrying out the process of this invention. The cellulose may advantageously be pretreated prior to the esterification to increase its reactivity. A preferred method of carrying out such pretreatment is to mix with each 100 parts by weight of the cellulose from 20 to 100 parts by weight of a lower aliphatic acid, such as formic acid, acetic acid, propionic acid, butyric acid, or mixtures of the same.

Following the pretreatment, the cellulose is contacted with an esterification medium containing, for each 100 parts by weight of cellulose, between 750 and 5000 parts by weight of methylene chloride, at least 2.0 or, preferably, between 2.7 and 10.0 mols of lower aliphatic acid anhydride and between 3 and 15 parts by weight of sulfuric acid. The esterification medium also contains, for each 100 parts by weight of methylene chloride, between 10 and 50 parts by weight of a lower aliphatic acid corresponding to the lower aliphatic acid anhydride. The esterification is normally carried out at temperatures between 15 and 45° C.

After the esterification is complete, the lower aliphatic acid ester of cellulose formed may, if desired, be hydrolyzed or ripened to increase its content of free hydroxyl groups and thereby alter its solubility and other characteristics. Thereafter, the said ester may be recovered from the esterification solution by mixing the same with a relatively large proportion of a non-solvent diluent to precipitate the ester. Alternatively, the esterification solution may be treated to remove therefrom acids, salts and the like without simultaneously precipitating the lower aliphatic acid ester of cellulose.

This invention will now be described specifically in connection with the manufacture of cellulose acetate which is commercially the most important lower aliphatic acid ester of cellulose at the present time. However, it may also be readily used for the manufacture of cellulose propionate and cellulose butyrate.

The following examples are given to illustrate this invention further.

*Example I*

There is mixed with 100 parts by weight of cotton linters, 35 parts by weight of glacial acetic acid and the mixture is stirred for 20 minutes at 25° C. There is then added to the cellulose 7 parts by weight of sulfuric acid. Thereafter, the pretreated cellulose is entered into an acetylation medium containing 720 parts by weight of acetic anhydride, 3900 parts by weight of methylene chloride and 420 parts by weight of acetic acid at a temperature of 25.0° C. The acetylation is completed in 263 minutes as evidenced by the clearing of the solution.

When the acetylation is repeated, omitting the acetic acid from the acetylation medium and employing in its stead an equal volume of methylene chloride, 333 minutes are required for the acetylation to go to completion.

*Example II*

The process of Example I is repeated, employing twice the amount of sulfuric acid catalyst. The time required to complete the acetylation is 186 minutes.

When, under these conditions, the acetic acid is omitted from the acetylation medium the time required to complete the acetylation is 235 minutes.

It is understood that the foregoing detailed description is given merely by way of illustration and that many variations may be made therein without departing from the spirit of my invention.

Having described my invention what I desire to secure by Letters Patent is:

1. Process for the manufacture of cellulose acetate which comprises pretreating cellulose with, for each 100 parts by weight of cellulose, a pretreating agent consisting essentially of from 20 to 100 parts by weight of acetic acid, and contacting the pretreated cellulose with an acetylation medium containing, for each 100 parts by weight of cellulose, 2.7 to 10.0 mols of acetic anhydride, 750 to 5000 parts by weight of methylene chloride, and 3 to 15 parts by weight of sulfuric acid, and, for each 100 parts by weight of methylene chloride, 10 to 50 parts by weight of acetic acid the presence of the latter acid serving to increase the esterification rate.

2. Process as set forth in claim 1 in which said pretreating is effected with 35 parts by weight of acetic acid per 100 parts of cellulose.

References Cited in the file of this patent

UNITED STATES PATENTS

| | | | |
|---|---|---|---|
| 2,104,023 | Clement | | Jan. 4, 1938 |
| 2,536,634 | Fraizy | | Jan. 2, 1951 |

FOREIGN PATENTS

| | | | |
|---|---|---|---|
| 407,355 | Great Britain | | Mar. 15, 1934 |